Feb. 13, 1934.  C. R. WASEIGE  1,946,956
DRIVING MECHANISM
Filed Feb. 14, 1931  2 Sheets-Sheet 1

INVENTOR
Charles Raymond Waseige.
BY F. B. Smith
ATTORNEY

Feb. 13, 1934.   C. R. WASEIGE   1,946,956
DRIVING MECHANISM
Filed Feb. 14, 1931   2 Sheets-Sheet 2

INVENTOR
Charles Raymond Waseige.
BY F. B. Smith
ATTORNEY

Patented Feb. 13, 1934

1,946,956

UNITED STATES PATENT OFFICE 1,946,956

DRIVING MECHANISM

Charles Raymond Waseige, Rueil, France, assignor to Eclipse Aviation Corporation, East Orange, N. J., a corporation of New Jersey Application February 14, 1931, Serial No. 515,868, and in France February 25, 1930

5 Claims. (Cl. 74—34)

This invention relates to driving mechanisms and particuliarly to means for driving propellers, although the invention is not confined in its novelty or utility to such application.

An object of the invention is to provide a driving mechanism having novel means for compensating for torque variations produced in the prime mover such as, for example, a multi-cylinder engine.

A further object of the invention is to provide a novel combination of shock absorbing and speed reducing mechanisms for drivably connecting the driving member, such as an internal combustion engine, with the driven member, such as a propeller.

A further object of the invention is to provide a driving mechanism of the foregoing character in which the shock absorbing members possess a degree of flexibility both in the angular and axial directions.

Another object of the invention is to provide means for permitting relative angular variations between the component parts of the shock absorbing mechanism in combination with means for limiting and checking such variations.

Another object of the invention is to provide a device for the purpose intended which shall be efficient, practical, reliable in its operation, compact in assembly, and capable of giving dependable service with but little attention on the part of the operator.

Other objects and advantages to be derived from the use of the invention will become more apparent on inspection of the following description, with reference to the accompanying drawings wherein several embodiments of the invention are illustrated. It is to be expressly understood, however, that said drawings are for the purpose of illustration only and are not to be construed as a definition of the limits of the invention, reference being had to the appended claims for this purpose.

Figure 1:
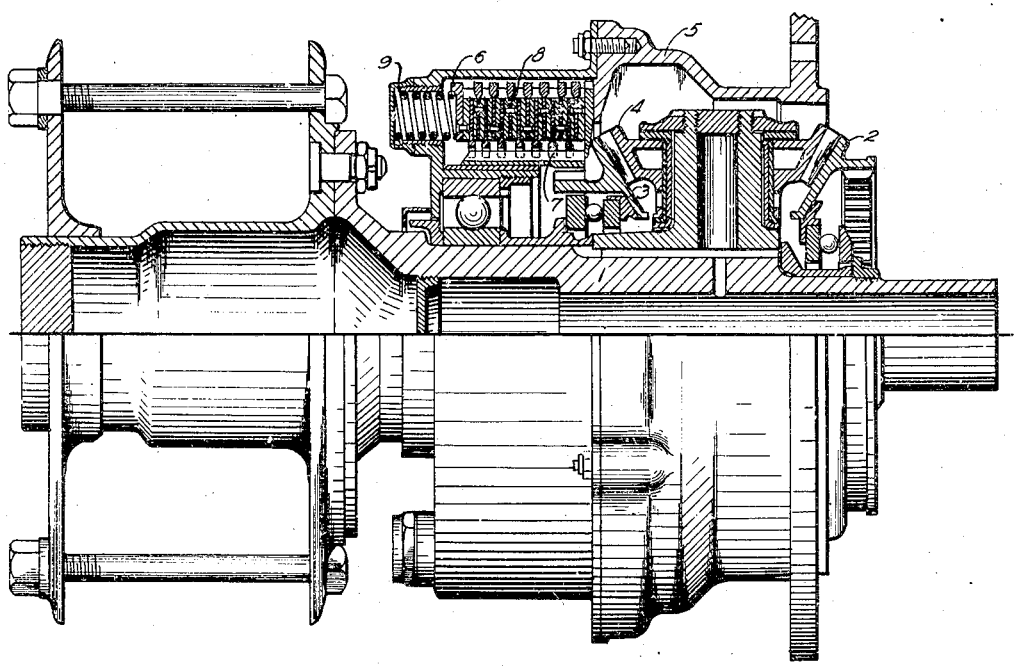
Fig. 1 is a half-section view through a device embodying the invention.

Referring to the drawings, the invention is shown embodied in a propeller driving mechanism employing a gear reduction mechanism to drivably connect the prime mover with the driven propeller, this gear mechanism being essentially the same as that shown in Reissue Patent No. 17,266 granted to me on April 9, 1929. As reproduced in the accompanying drawings, such mechanism comprises a combination ring and bevel gear 2 adapted to be driven from the power shaft of the prime mover, (not shown) a second relatively stationary combination ring and bevel gear 3 (or "sun wheel" as it is termed in the aforesaid reissue patent) in combination with a plurality of planetary bevel pinions 4 rotatably supported by the propeller shaft and meshing with both sun wheels 2 and 3, the pinions being keyed to the propeller shaft as shown so as to constitute a positive drive therefor as they are rotated about their own axes and also about the axis of the propeller shaft in response to actuation of sun wheel 2 from the prime mover.

In mechanism heretofore employing this construction, it has been customary to secure the ring gear 3 substantially rigidly to the housing so as to secure positive rotation of the driving pinions 4 and hence a positive drive to the propeller or other ultimately driven member. As a result, in such construction, the vibrations which occur in the prime mover, particularly where the prime mover is an internal combustion engine, and irrespective of the number of cylinders, are transmitted to all parts connecting the crank shaft to the propeller or other driven member, which vibrations are of course highly objectionable, particularly where gearing is employed.

Figure 2:
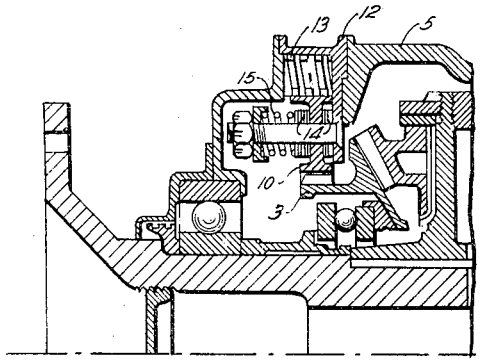
Fig. 2 shows another embodiment of the invention, and is a section view through 2—2 of Fig. 3.
Figure 3:
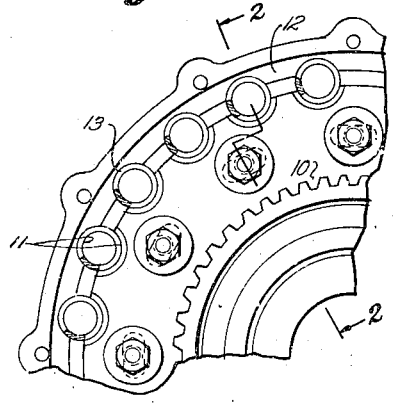
Fig. 3 is a part front view, the cover being taken off.

Thus, referring to the drawings, and particularly to Figs. 1 to 3, inclusive, it will be seen that gear 4 is adapted to yield relatively to the housing 5 by virtue of the provision of a novel torque reaction and shock absorbing mechanism, which, as shown, takes the form of a multi-disc clutch made of an inner set of discs 7 connected to gear 3 by a suitable splined construction, the outer set of discs 6 being connected to the housing 5 by means of similar splines. Friction discs 8 are preferably secured to these outer discs 6. All these discs are pressed together against the housing 5 by means of springs 9. With this arrangement gear 3 may turn in the housing 5 when the torque reaction taken by the gear 3 is greater than its clutch capacity. Its displacement is then a series of angular slides, always in the same direction.

In the embodiment shown, in Figs. 2 and 3, the shock absorber device is again placed between gear 3 and housing 5. A driving or shock imparting member 10 is splined to gear 3 and has a plurality of slots 11 at its periphery, corresponding to similar slots formed in the driven, or shock absorbing member 12 which is integral with the housing. In these slots are located coiled springs 13 connecting elastically the members 10 and 12, and allowing limited oscillation of the former. To avoid vibrations these oscillations are limited and checked, by the provision of novel means taking the form of clutch discs 14 and springs 15 pressing member 10 against member 12.

Figure 4:
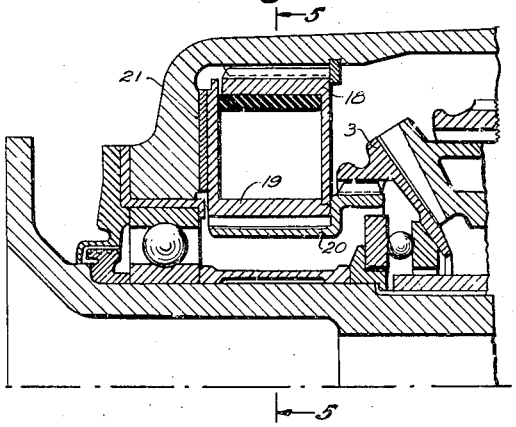
Fig. 4 is a part view similar to Fig. 1, but of a third embodiment of the invention and is a sectional view through 4—4 of Fig. 5.

In the modification shown in Fig. 4 connection of gear 3 to the housing is made by means of an elastic material (rubber for example) which fills up completely the space left between the two slotted members 19 and 18 so that its dimensions or volume cannot increase, thereby allowing only relatively slight angular oscillations. Member 19 is connected to gear 3 by splines 20 and member 18 is in turn splined to the housing 5. Each of these members 18 and 19 is preferably provided with a flange so as to have the rubber tighten from all sides and prevent oil from filling up the housing 5. The rubber allowing but little oscillation of gear 3 relatively to housing 5, a plate 21, made of suitable metal such as bronze for example, is placed between member 19 and housing 5 to facilitate sliding movement of the latter.

Figure 6:
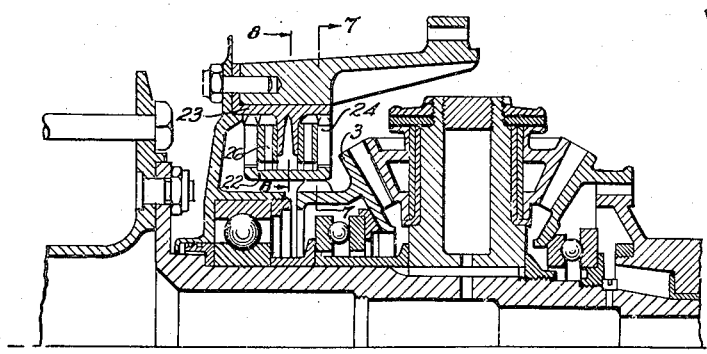
Fig. 6 is a part view similar to Fig. 1, but showing another embodiment of the shock absorbing device.
Figure 7:
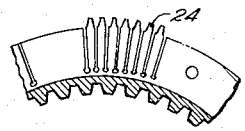
Fig. 7 is a section through 7—7 of Fig. 6.
Figure 8:
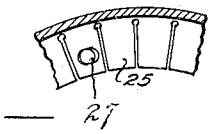
Fig. 8 is a section through 8—8 of Fig. 7.
Figure 5:
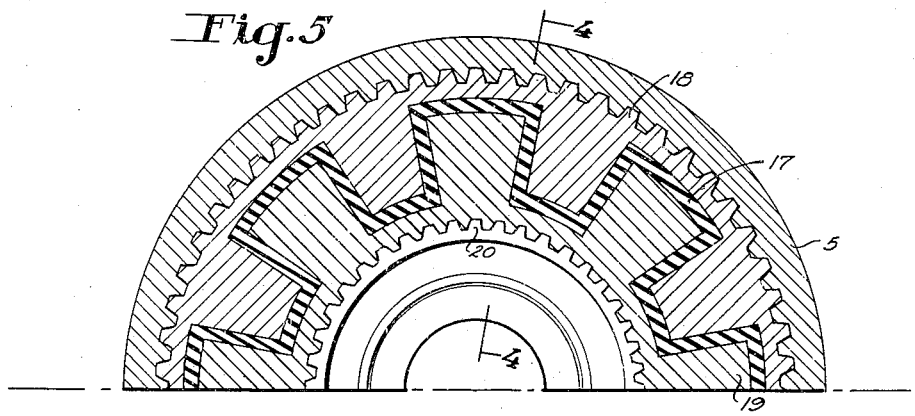
Fig. 5 is a section through 5—5 of Fig. 4.

Another means to make the elastic connection between gear 3 and housing 5 is shown in Figs. 6 to 8. In the embodiment there shown, a driving or shock imparting member 22 splined on gear 3 is connected to a driven, or shock absorbing member 23 by means of long thin teeth 24 at its periphery, member 23 being preferably secured to housing 5 and also provided with teeth 24 made to have a certain axial flexibility which flexibility is used to press friction discs 26 against member 22, axial strength being added by providing bolts 27 going through elongated holes of teeth 25. It is evident that again in this construction, gear 3 can oscillate elastically in housing 5 and that its oscillations are checked. Of course, teeth giving the circumferential flexibility could be made to give the axial flexibility also.

Figures 10, 11:
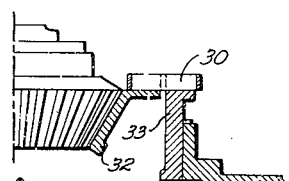
Figs. 9 and 10 show schematically another embodiment of the invention.
Figs. 11 and 12 show schematically still another embodiment of the invention.
Figure 9:
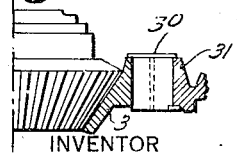
Figure 12:
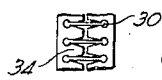

The elastic coupling may also be made as shown in Figs. 9 to 12 wherein flat springs 30 are provided to connect gear 3 to a member 31 which is secured to the housing. In Fig. 10 flat springs connect the driving gear 32 to a plate 33 secured so as to rotate with the engine shaft. The slots retaining these flat springs have chambers 34 to allow an elastic displacement of the springs.

While several embodiments have been illustrated, it is to be understood that the invention is not limited thereto, but may be applied to any kind of gearing mechanism, for example, to spur gear mechanism; and that other changes, which will now appear evident to those skilled in the art, may be made in the form, details of construction and arrangement of the parts, without departing from the scope of the invention. Reference is therefore to be had to the appended claims for a definition of the limits of the invention.

What is claimed is:

1. In combination with a member to be driven, a shaft for driving said driven member, a gear drivably connected to said shaft, traction means for said gear including a plurality of yielding torque absorbing clutch units actuated by said gear, a series of bolts disposed in parallelism and corresponding in number to the number of said clutch units, each of said bolts extending through the corresponding clutch unit, and means on each of said bolts for adjusting the frictional pressure thereon.

2. In combination with a member to be driven and power driving means therefor, a gear interposed between said power means and said driven member, a second gear meshing with said first named gear and having a plurality of recesses along its periphery, a plurality of resilient members in the form of springs wound helically about parallel center lines, all of which are normal to the common plane of said recesses, said springs acting to absorb the torque generated in said power means and to return the same to said gears and driven member, and means for exerting an axial pressure tending to hold said resilient members in frictional driven association with said power means, said last named means comprising a second group of resilient members and means for mounting said resilient members so as to cause them to exert their pressure against the lateral surfaces of said second named gear.

3. In combination with a member to be driven and power driving means therefor, a gear interposed between said power means and driven member, a second gear meshing with said first named gear and having a plurality of recesses along its periphery, a plurality of resilient members in the form of springs wound helically about parallel center lines, all of which are normal to the common plane of said recesses, said springs acting to absorb the torque generated in said power means, and to return the same to said gears and driven member, a member surrounding said second named gear and provided with recesses corresponding to the recesses in said second named gear and adapted to register with said resilient members, and means for exerting an axial pressure tending to hold said second named gear and surrounding member in torque transmitting relation.

4. In combination with a member to be driven and power driving means therefor, a gear interposed between said power means and driven member, a second gear meshing with said first named gear and having a plurality of recesses along its periphery, a plurality of resilient members in the form of springs wound helically about parallel center lines, all of which are normal to the common plane of said recesses, said springs acting to absorb the torque generated in said power means, and to return the same to said gears and driven member, said means comprising a member surrounding said second named gear and provided with recesses corresponding to the recesses in said second named gear and adapted to register with said resilient members, and means for exerting an axial pressure tending to hold said second named gear and surrounding member in torque transmitting relation, said last named means comprising a plurality of friction surfaces interposed between the lateral surfaces of said second named gear and surrounding member.

5. In combination with a member to be driven and power driving means therefor, a gear interposed between said power means and driven member, a second gear meshing with said first named gear and having a plurality of recesses along its periphery, a plurality of resilient members in the form of springs wound helically about parallel center lines, all of which are normal to the common plane of said recesses, said springs acting to absorb the torque generated in said power means, and to return the same to said gears and driven member, said means comprising a member surrounding said second named gear and provided with recesses corresponding to the recesses in said second named gear and adapted to register with said resilient members, and means for exerting an axial pressure tending to hold said second named gear and surrounding member in torque transmitting relation, said last named means comprising a second group of resilient members disposed in parallel relation to said first named resilient members and mounted so as to exert a checking action on the degree of oscillation permitted between said second named gear and surrounding member.

CHARLES RAYMOND WASEIGE.